Inventor.
Elena May Garside

Patented July 4, 1939

2,165,045

UNITED STATES PATENT OFFICE 2,165,045

CALIBRATED SELF-SUPPORTING SANITARY SPOON

Elena May Garside, Spokane, Wash.

Application February 16, 1938, Serial No. 190,786

2 Claims. (Cl. 73—62)

The invention relates to an improved calibrated, self-supporting sanitary spoon. The object of the invention is to provide a spoon that is marked or calibrated to enable users to easily and with one hand measure liquids, such as medicines, flavors, and coloring matter.

A further object of my invention is to enable user to set a filled spoon down in any emergency that might arise in a sick room as is often necessary.

A further object of my invention is the provision of a spoon which will readily lend itself not only to metal but also fiberboard, plastics, waterproof paper or cardboard, to be destroyed after administering medicine to patients with contagious diseases.

Figure 1:
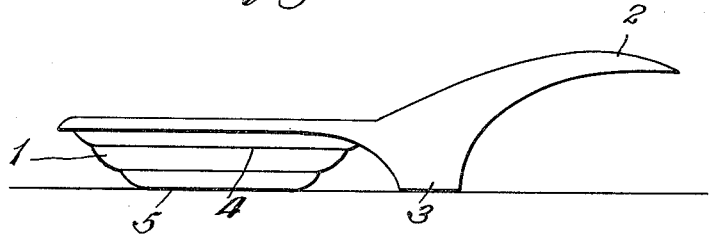
Figure 2:
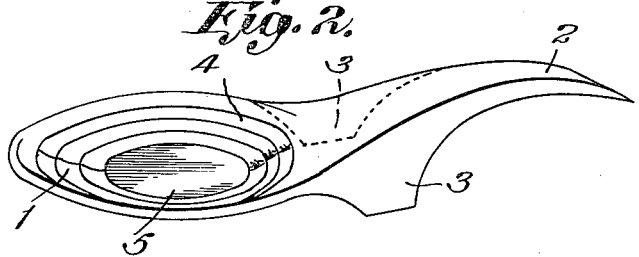
Figure 3:
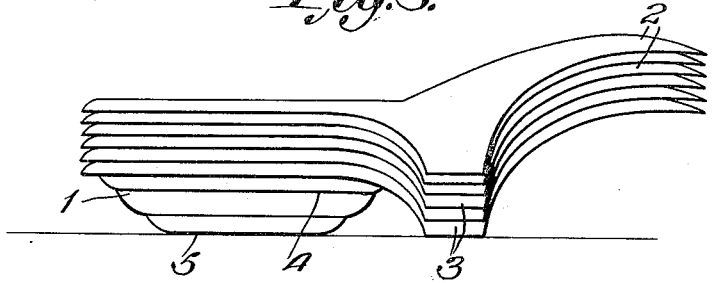
Figure 4:
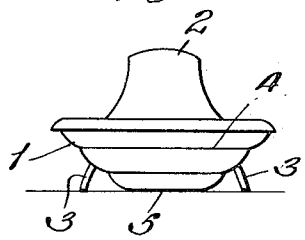

In the accompanying drawing, forming a part of this specification, Fig. 1 of the invention is a vertical view of the entire spoon; Fig. 2 is a detailed view in perspective of spoon as taken from side; Fig. 3 is a vertical view showing that it is possible to nest this improved spoon. Fig. 4 is a vertical view of bowl end of spoon at eye level.

Referring to the drawing, I designates the bowl of the spoon, 2 the handle, 3 the two supporting legs, 4 the calibrations of which there are three. Bowl I is provided with a flat bottom 5, and calibrations 4. The handle 2 is short and made in an arc. The legs 3 are on the same level as bottom of bowl 5.

As is well known, there is always more or less difficulty in administering medicines—a patient, especially a baby, will need attention after you have filled an ordinary spoon with liquid, necessitating the setting of the spoon down causing part or all of dose to be wasted. With the use of the spoon of my invention this waste would be eliminated.

And in measuring extracts and coloring matter in advance to using, while preparing ingredients in cooking, my invention would be of benefit to cooks and housewives.

By having the bottom 5 of the bowl I flat and arranged exactly in alinement with the supporting legs 3, an accurate measurement of liquids is assured.

The handle 2 is raised in an arc to facilitate the lifting or replacing of the spoon.

The legs 3 form an arch at base of handle as of Fig. 2 and Fig. 4, balancing and supporting spoon.

The calibrations 4, of which there are three ¼-½-1 tea or table-spoon are to be molded or pressed in to bowl I of spoon.

Having thus described the invention what is claimed is:

1. A spoon comprising a bowl and handle portions, the bowl being calibrated in terms of different capacities, the handle having one or more downwardly extending lugs terminating in line with the bottom of the bowl, whereby the spoon will remain substantially level when placed upon a flat surface.

2. A spoon comprising bowl and handle portions, the bowl being calibrated in terms of different capacities, the handle extending arcuately upwardly and away from the bowl and being also arcuate transversely to rest upon and conform generally to the index finger of the user, the opposite edges of said handle adjacent said bowl having downwardly extending lugs terminating substantially in the plane of the bottom of said bowl, whereby the spoon will not tilt when placed upon a flat surface.

ELENA MAY GARSIDE.